United States Patent
Tamura et al.

(10) Patent No.: US 11,271,208 B2
(45) Date of Patent: Mar. 8, 2022

(54) SECONDARY BATTERY AND METHOD FOR MANUFACTURING SECONDARY BATTERY

(71) Applicant: SANYO Electric Co., Ltd., Daito (JP)

(72) Inventors: Takahiro Tamura, Hyogo (JP); Shinichi Yamami, Hyogo (JP); Fumiya Kanetake, Hyogo (JP); Kentaro Takahashi, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 176 days.

(21) Appl. No.: 16/662,243

(22) Filed: Oct. 24, 2019

(65) Prior Publication Data
US 2020/0136144 A1 Apr. 30, 2020

(30) Foreign Application Priority Data
Oct. 30, 2018 (JP) .............................. JP2018-204297

(51) Int. Cl.
| | |
|---|---|
| *H01M 4/62* | (2006.01) |
| *H01M 4/133* | (2010.01) |
| *H01M 4/02* | (2006.01) |
| *H01M 4/1393* | (2010.01) |
| *H01M 4/04* | (2006.01) |
| *H01M 4/587* | (2010.01) |
| *H01M 10/0525* | (2010.01) |

(52) U.S. Cl.
CPC .......... *H01M 4/621* (2013.01); *H01M 4/133* (2013.01); *H01M 4/625* (2013.01); *H01M 2004/027* (2013.01)

(58) Field of Classification Search
CPC .. H01M 4/0404; H01M 4/0435; H01M 4/133; H01M 4/1393; H01M 4/587; H01M 4/621; H01M 4/622; H01M 4/625; H01M 2004/021; H01M 2004/027; H01M 10/0525; Y02E 60/10
See application file for complete search history.

(56) References Cited

U.S. PATENT DOCUMENTS

| | | | |
|---|---|---|---|
| 2015/0243989 A1 | 8/2015 | Yamada et al. | |
| 2018/0013146 A1* | 1/2018 | Yamada | ................. C01B 32/20 |

FOREIGN PATENT DOCUMENTS

| | | |
|---|---|---|
| JP | 2013-4241 A | 1/2013 |
| JP | 2014-60148 A | 4/2014 |

* cited by examiner

*Primary Examiner* — Brittany L Raymond
(74) *Attorney, Agent, or Firm* — Westerman, Hattori, Daniels & Adrian, LLP

(57) ABSTRACT

A secondary battery according to one aspect of the present disclosure includes a negative electrode which includes a negative electrode core and a negative electrode active material layer provided on at least one surface of the negative electrode core. In this secondary battery, the negative electrode active material layer includes a negative electrode active material which contains graphite having a crystalline size of 10 nm or more and an interlayer distance $d_{002}$ of 0.3356 to 0.3360 nm and a rubber-based binding material having an average primary particle diameter of 120 to 250 nm, the negative electrode active material has a pore capacity of 0.5 ml/g or less at a pore diameter of 0.2 to 1 μm measured by a mercury porosimeter, and the rate of the average primary particle diameter of the rubber-based binding material to the pore capacity of the negative electrode active material is 1.15 to 1.70 $g/m^2$.

8 Claims, 1 Drawing Sheet

SECONDARY BATTERY AND METHOD FOR MANUFACTURING SECONDARY BATTERY

CROSS REFERENCE TO RELATED APPLICATIONS

The present invention application claims priority to Japanese Patent Application No. 2018-204297 filed in the Japan Patent Office on Oct. 30, 2018, the entire contents of which are incorporated herein by reference.

BACKGROUND OF THE INVENTION

Field of the Invention

The present disclosure relates to a secondary battery and a method for manufacturing a secondary battery.

Description of Related Art

Although a secondary battery which uses a carbon material as a negative electrode active material has been widely used, there have been problems relating to low temperature regeneration characteristics, high temperature durability, and the like.

For example, in order to improve the low temperature regeneration characteristics, Japanese Published Unexamined Patent Application No. 2014-60148 (Patent Document 1) has disclosed a surface coated carbon material containing graphite particles as nuclei and carbon black. In addition, in order to improve a peeling strength of an electrode active material layer, Japanese Published Unexamined Patent Application No. 2013-4241 (Patent Document 2) has disclosed a negative electrode active material layer containing a styrene-butadiene rubber (SBR) having an average particle diameter of 100 nm or less.

BRIEF SUMMARY OF THE INVENTION

For a secondary battery, to improve the high temperature durability while the low temperature regeneration characteristics are maintained is an important subject. In order to improve the high temperature durability, the techniques disclosed in Japanese Published Unexamined Patent Application Nos. 2014-60148 and 2013-4241 are each still required to be further improved.

A secondary battery according to one aspect of the present disclosure comprises: a negative electrode which includes a negative electrode core and a negative electrode active material layer provided on at least one surface of the negative electrode core. In the secondary battery described above, the negative electrode active material layer includes a negative electrode active material which contains graphite having a crystalline size of 10 nm or more and an interlayer distance $d_{002}$ of 0.3356 to 0.3360 nm and a rubber-based binding material having an average primary particle diameter of 120 to 250 nm, the negative electrode active material has a pore capacity of 0.5 ml/g or less at a pore diameter of 0.2 to 1 μm which is measured by a mercury porosimeter, and the rate of the average primary particle diameter of the rubber-based binding material with respect to the pore capacity of the negative electrode active material (that is, the particle diameter of the rubber-based binding material/the pore capacity of the negative electrode active material) is 1.15 to 1.70 g/m².

A method for manufacturing a secondary battery according to another aspect of the present disclosure comprises: a step of performing at least one of pressure application to a negative electrode active material containing graphite which has a crystalline size of 10 nm or more and an interlayer distance $d_{002}$ of 0.3356 to 0.3360 nm and filling of a carbonaceous material into pores of the negative electrode active material so that the negative electrode active material has a pore capacity of 0.5 ml/g or less at a pore diameter of 0.2 to 1 μm which is measured by a mercury porosimeter; a step of kneading the negative electrode active material and a rubber-based binding material having an average primary particle diameter of 120 to 250 nm to prepare a negative electrode active material slurry; and a step of applying the negative electrode active material slurry to a negative electrode core to form a negative electrode active material layer. In the method described above, the rate of the average primary particle diameter of the rubber-based binding material to the pore capacity of the negative electrode active material (that is, the particle diameter of the rubber-based binding material/the pore capacity of the negative electrode active material) is 1.15 to 1.70 g/m².

According to the aspect of the present disclosure, a secondary battery having excellent low temperature regeneration characteristics and excellent high temperature durability can be provided.

DETAILED DESCRIPTION OF THE INVENTION

Figure 1:
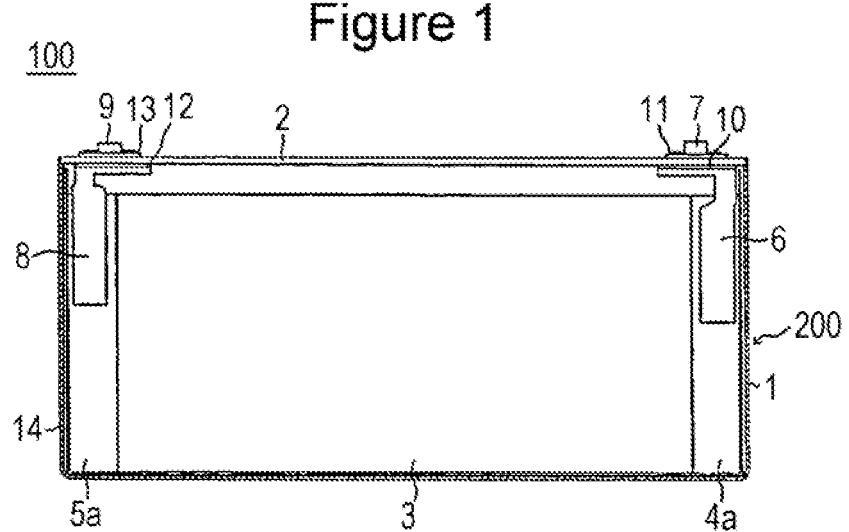
FIG. 1 is a front view of a secondary battery which is one example of an embodiment and shows the state in which front portions of a battery case and an insulating sheet are removed.

As described above, for the secondary battery, to simultaneously obtain the low temperature regeneration characteristics and the high temperature durability is an important subject. In addition, the high temperature durability indicates high temperature storage characteristics and high temperature cycle characteristics, each of which will be described in Examples.

According to the technique disclosed in Japanese Published Unexamined Patent Application No. 2014-60148, by the surface coated carbon material containing carbon black, a reaction area of a negative electrode is increased, so that the low temperature regeneration characteristics are improved. However, when the reaction area is increased, a sub-reaction, such as irreversible production of a lithium compound by a reaction between an electrolyte liquid and an active material, is promoted, and hence the technique disclosed in Japanese Published Unexamined Patent Application No. 2014-60148 has a problem in terms of high temperature durability.

In addition, by the use of the technique disclosed in Japanese Published Unexamined Patent Application No. 2013-4241, since a large amount of an SBR having a small particle diameter intrudes into an active material, and the amount of the SBR capable of contributing to an adhesion strength to a negative electrode core is decreased, in order to maintain the adhesion strength, the content of the SBR in the negative electrode active material layer is required to be increased. Hence, the technique disclosed in Japanese Published Unexamined Patent Application No. 2013-4241 has a problem in terms of low temperature regeneration characteristics.

Through intensive research carried out to solve the problems described above, the present inventors found that when a negative electrode active material layer includes a negative electrode active material which contains graphite having a crystalline size of 10 nm or more and an interlayer distance $d_{002}$ of 0.3356 to 0.3360 nm and a rubber-based binding material having an average primary particle diameter of 120 to 250 nm, the negative electrode active material has a pore capacity of 0.5 ml/g or less at a pore diameter of 0.2 to 1 μm which is measured by a mercury porosimeter, and the rate of the average primary particle diameter of the rubber-based binding material to the pore capacity of the negative electrode active material (that is, the particle diameter of the rubber-based binding material/the pore capacity of the negative electrode active material) is 1.15 to 1.70 $g/m^2$, a secondary battery excellent in low temperature regeneration characteristics and high temperature durability can be obtained.

Since the pore diameter of the negative electrode active material is decreased by pressure application thereto, or while a carbonaceous material is filled in the pores of the negative electrode active material, since the particle diameter of the rubber-based binding material, such as a styrene butadiene rubber (SBR) or its modified material, is set to be a predetermined value or more, the intrusion of the rubber-based binding material into the pores of the negative electrode active material can be suppressed, and hence, the content of the rubber-based binding material in the negative electrode active material layer can be decreased. As a result, while the low temperature regeneration characteristics are maintained, the high temperature durability can be improved.

The graphite having a crystalline size of 10 nm or more and an interlayer distance $d_{002}$ of 0.3356 to 0.3360 nm has a significantly high crystallinity. Since the graphite having a significantly high crystallinity as described above is used, a secondary battery having a more excellent battery capacity is obtained.

In addition, the negative electrode active material preferably contains flake graphite as the graphite and is preferably formed from a plurality of flake graphite particles gathered together. In addition, it is preferable that the flake graphite particles are bent and are overlapped with each other to form particles of the negative electrode active material. When the negative electrode active material as described above is used, the present invention is particularly effective.

Hereinafter, one example of the embodiment of the present disclosure will be described in detail. In this embodiment, although a square battery including a battery case 200 which is a square metal case will be described by way of example, the battery case is not limited to have a square shape, and for example, a battery case formed of a laminate sheet containing a metal layer and a resin layer may also be used. In addition, in both of a positive electrode and a negative electrode, the case in which active material layers are formed on two surfaces of each core will be described by way of example, the active material layers are not limited to be formed on the two surfaces of each core, and the active material layer may be formed on at least one surface of each core. In addition, in this specification, when the "approximately" is described using "approximately the same, the "approximately the same" includes both the states indicating "exactly the same" and "substantially the same".

Figure 2:
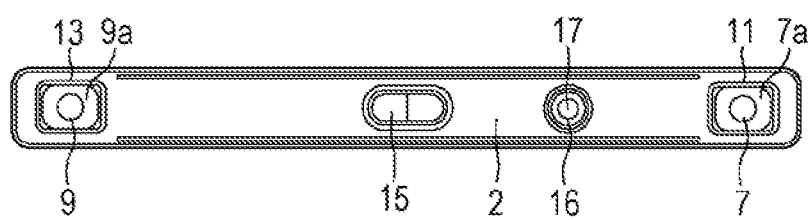
FIG. 2 is a plan view of the secondary battery which is the example of the embodiment.

As shown in FIGS. 1 and 2, a secondary battery 100 includes a flatly formed winding type electrode body 3 in which a positive electrode and a negative electrode are wound with at least one separator interposed therebetween and which has a flat portion and a pair of curving portions; an electrolyte liquid; and the battery case 200 receiving the electrode body 3 and the electrolyte liquid. The battery case 200 includes a bottom-closed square exterior package 1 having an opening and a sealing plate 2 sealing the opening of the square exterior package 1. The square exterior package 1 and the sealing plate 2 are each formed from a metal and are preferably formed from aluminum or an aluminum alloy.

The square exterior package 1 has an approximately rectangular bottom potion in bottom view and a side wall portion standing up along the periphery of the bottom portion. The side wall portion is formed perpendicular to the bottom portion. Although the dimensions of the square exterior package 1 are not particularly limited, as one example, a lateral direction length is 130 to 160 mm, the height is 60 to 70 mm, and the thickness is 15 to 18 mm. In this specification, for the convenience of illustration, a direction along the longitudinal direction of the bottom portion of the square exterior package 1 is called "lateral direction" of the square exterior package 1, a direction perpendicular to the bottom portion is called "height direction", and a direction perpendicular to the lateral direction and the height direction is called "thickness direction".

The electrolyte liquid contains a solvent and an electrolyte salt dissolved therein. The solvent is, for example, a nonaqueous solvent. As the nonaqueous solvent, for example, there may be used an ester, an ether, a nitrile, an amide, or a mixed solvent containing at least two types of those mentioned above. The nonaqueous solvent may also contain a halogen substitute in which at least one hydrogen atom of each of those solvents is replaced with a halogen atom, such as fluorine. As the electrolyte salt, for example, a lithium salt, such as $LiPF_6$, may be used.

The positive electrode is a long body including a metal-made positive electrode core and positive electrode active material layers formed on two surfaces of the core, and a belt-shaped core exposing portion 4a at which the positive electrode core is exposed is formed at an end in the lateral direction along a longitudinal direction of the positive electrode core. As is the case described above, the negative electrode is a long body including a metal-made negative electrode core and negative electrode active material layers formed on two surfaces of the core, and a belt-shaped core exposing portion 5a at which the negative electrode core is exposed is formed at an end in the lateral direction along a longitudinal direction of the negative electrode core. The electrode body 3 has the structure in which while the core exposing portion 4a of the positive electrode is disposed at one end side in an axial direction of the electrode body 3, and the core exposing portion 5a of the negative electrode is disposed at the other end side in the axial direction of the electrode body 3, the positive electrode and the negative electrode are wound with at least one separator interposed therebetween.

A positive electrode collector 6 and a negative electrode collector 8 are connected to a lamination portion of the core exposing portion 4a of the positive electrode and a lamination portion of the core exposing portion 5a of the negative electrode, respectively. A preferable positive electrode collector 6 is formed from aluminum or an aluminum alloy. A preferable negative electrode collector 8 is formed from copper or a copper alloy. A positive electrode terminal 7 includes a guard portion 7a disposed at the sealing plate 2 at an out side of the battery and an insertion portion to be inserted into a through hole provided in the sealing plate 2 and is electrically connected to the positive electrode collector 6. In addition, a negative electrode terminal 9 includes a guard portion 9a disposed at the sealing plate 2 at an out side of the battery and an insertion portion to be inserted into a through hole provided in the sealing plate 2 and is electrically connected to the negative electrode collector 8.

The positive electrode terminal 7 and the positive electrode collector 6 are fixed to the sealing plate 2 with an external insulating member 11 and an internal insulating member 10, respectively. The internal insulating member 10 is disposed between the sealing plate 2 and the positive electrode collector 6, and the external insulating member 11 is disposed between the sealing plate 2 and the positive electrode terminal 7. As is the case described above, the negative electrode terminal 9 and the negative electrode collector 8 are fixed to the sealing plate 2 with an external insulating member 13 and an internal insulating member 12, respectively. The internal insulating member 12 is disposed between the sealing plate 2 and the negative electrode collector 8, and the external insulating member 13 is disposed between the sealing plate 2 and the negative electrode terminal 9.

The electrode body 3 is received in the square exterior package 1 while being covered with an insulating sheet 14. The sealing plate 2 is connected to an opening edge portion of the square exterior package 1 by laser welding or the like. The sealing plate 2 includes an electrolyte liquid charge port 16, and after the electrolyte liquid is charged in the battery case 200, this electrolyte liquid charge port 16 is sealed with a sealing plug 17. In the sealing plate 2, a gas discharge valve 15 which discharges a gas when the pressure in the battery is increased to a predetermined value or more is formed.

Hereinafter, the positive electrode, the negative electrode 5, and the separator, each of which forms the electrode body 3, will be described, and in particular, the negative electrode 5 will be described in detail.

[Positive Electrode]

As described above, the positive electrode includes the positive electrode core and the positive electrode active material layers formed on the two surfaces of the positive electrode core. For the positive electrode core, for example, there may be used foil of a metal, such as aluminum or an aluminum alloy, stable in a positive electrode potential range or a film having a surface layer formed from the metal mentioned above. The positive electrode active material layer contains a positive electrode active material, an electrically conductive material, and a binding material. The positive electrode can be manufactured in such a way that after a positive electrode active material slurry containing the positive electrode active material, the electrically conductive agent, the binding material, a dispersion medium, and the like on the surfaces of the positive electrode cores, followed by drying to remove the dispersion medium, coating films thus obtained are compressed to form the positive electrode active material layers on the two surfaces of the positive electrode core.

The positive electrode active material is formed from a lithium transition metal composite oxide as a primary component. As a metal element contained in the lithium transition metal composite oxide, for example, there may be mentioned Ni, Co, Mn, Al, B, Mg, Ti, V, Cr, Fe, Cu, Zn, Ga, Sr, Zr, Nb, In, Sn, Ta, or W. One example of a preferable lithium transition metal composite oxide is a composite oxide containing at least one of Ni, Co. and Mn. In addition, to particle surfaces of the lithium transition metal composite oxide, for example, inorganic compound particles of an aluminum oxide, a lanthanoid-containing compound, or the like, may be tightly adhered.

As the electrically conductive material contained in the positive electrode active material layer, a carbonaceous material, such as carbon black, acetylene black, Ketjen black, or graphite, may be mentioned by way of example. As the binding material contained in the positive electrode active material layer, for example, there may be mentioned a fluorine resin, such as a polytetrafluoroethylene (PTFE) or a poly(vinylidene fluoride) (PVdF), a polyacrylonitrile (PAN), a polyimide, an acrylic resin, or a polyolefin. Those resins each may also be used together with a thickening material including at least one of a cellulose derivative, such as a carboxymethyl cellulose (CMC) or a salt thereof, a poly(ethylene oxide) (PEO), and the like.

[Negative Electrode]

Figure 3:
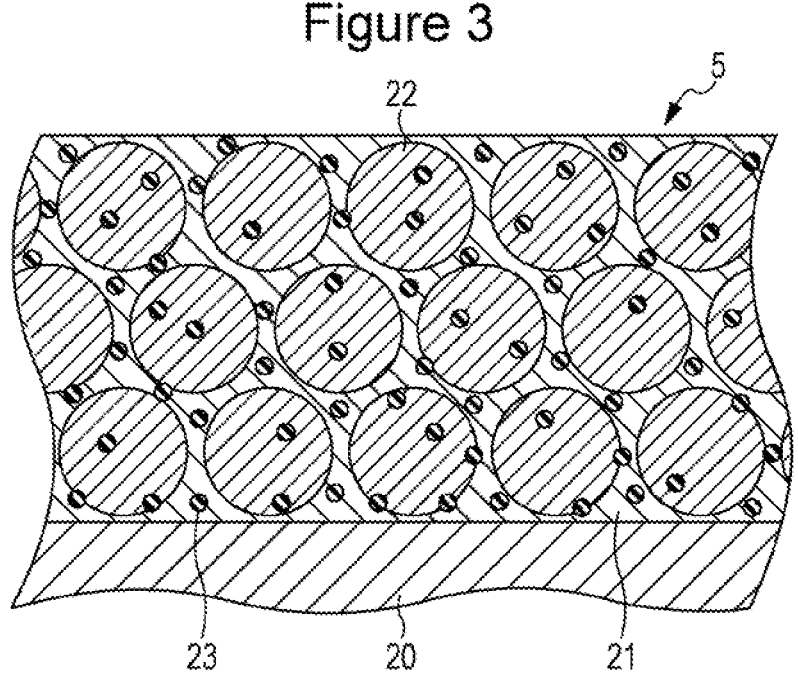
FIG. 3 is a cross-sectional view of a negative electrode which is one example of the embodiment.

Hereinafter, with reference to FIG. 3, the negative electrode 5 will be described, and in particular, a negative electrode active material 22 will be described in detail. FIG. 3 shows a cross-section which is perpendicular to the longitudinal direction of the negative electrode 5 and which is passing through the center thereof As described above, the negative electrode 5 includes a negative electrode core 20 and negative electrode active material layers 21 formed on two surfaces of the negative electrode core 20. For the negative electrode core 20, for example, there may be used foil of a metal, such as copper or a copper alloy, stable in a potential range of the negative electrode 5 or a film having a surface layer formed from the metal mentioned above. The thickness of the negative electrode core 20 is, for example, 5 to 20 μm.

The negative electrode active material layer 21 includes the negative electrode active material 22 and a rubber-based binding material 23. The thickness of the negative electrode active material layer 21 is, at one surface side of the negative electrode core 20, for example, 50 to 150 μm and preferably 80 to 120 μm.

The negative electrode active material is preferably formed from graphite as a primary component. For example, the content of graphite in the negative electrode active material on a volume basis, is preferably 60% or more, more preferably 80% or more, and further preferably 90% or more. As a raw material of the negative electrode active material 22, natural graphite may be used. The negative electrode active material 22 preferably contains graphite having a crystalline size of 10 nm or more and an interlayer distance $d_{002}$ of 0.3356 to 0.3360 nm. The graphite described above preferably contains a plurality of flake graphite particles. In addition, while being folded and overlapped with each other, the plurality of flake graphite particles preferably forms the negative electrode active material 22. The external shape of the negative electrode active material 22 is preferably approximately spherical particles. A central particle diameter (D50) of the negative electrode active material 22 is, for example, 5 to 30 μm. In this specification, unless otherwise particularly noted, the central particle diameter indicates a particle diameter (D50) at which the volume cumulative value is 50% in a particle size distribution measured by a laser diffraction scattering method.

The pore capacity and the average pore diameter of the negative electrode active material 22 can be measured using a mercury porosimeter (such as Autopore IV9510, manufactured by Micromeritics Instrument Corp.). The pore capacity of the negative electrode active material 22 at a pore diameter of 0.2 to 1 μm which is measured by a mercury porosimeter is 0.5 ml/g or less and preferably 0.1 to 0.2 ml/g.

The pore diameter of the negative electrode active material 22 can be decreased by pressure application. As a pressure application method, for example, a mechanical method, such as pressing, may be used. When the negative electrode active material 22 is used after the pore diameter thereof is decreased by compression, the input/output characteristics and the battery capacity of the secondary battery 100 can both be improved with good balance.

In the pores of the negative electrode active material 22, a carbonaceous material can be filled. As a filling method, for example, a method in which after pitch is impregnated in the pores under high pressure or reduced pressure conditions, firing is performed, for example, at 50° C. to 2,000° C. in a nitrogen atmosphere. Accordingly, the pores of the negative electrode active material 22 are filled with a fired product of the pitch. The carbonaceous material may contain amorphous carbon or crystalline carbon. The amorphous carbon is preferable in view of improvement in input/output characteristics of the secondary battery 100. The crystalline carbon is preferable in view of improvement in battery capacity and durability. The carbonaceous material more preferably contains amorphous carbon as a primary component. The primary component indicates a major component, the content of which is high, among components contained in the carbonaceous material. The "amorphous carbon is contained as a primary component" indicates that the content thereof is higher than that of the crystalline carbon. The ratio of the amorphous carbon to the crystalline carbon can be changed by a filling method, such as a firing temperature.

The ratio of the amorphous carbon to the crystalline carbon of the carbonaceous material filled in the pores of the negative electrode active material 22 can be obtained by measurement of the negative electrode active material layer 21 using a Raman spectroscopy. In a Raman spectrum, a peak of G-band derived from the graphite structure is observed at approximately 1,590 cm$^{-1}$, and a peak of D-band derived from a defect is observed at approximately 1,350 cm$^{-1}$. The peak intensity ratio of D-band/G-band can be used as an index of the amount of the amorphous carbon, and a higher ratio indicates a larger amount of the amorphous carbon.

For the rubber-based binding material 23 contained in the negative electrode active material layer 21, for example, a styrene butadiene rubber (SBR) or its modified material may be used. The average primary particle diameter of the rubber-based binding material 23 is preferably 120 to 250 nm and more preferably 150 to 230 nm. In the negative electrode active material layer 21, a binding material, such as a fluorine-containing resin, such as a PTFE or a PVdF, a PAN, a polyimide, an acrylic resin, or a polyolefin, may also be further contained. In addition, in the negative electrode active material layer 21, a carboxymethyl cellulose (CMC) or its salt, a polyacrylic acid (PAA) or its salt, or a PVA may also be contained. The CMC or its salt functions as a thickening material which adjusts the viscosity of a negative electrode active material slurry in an appropriate range and also functions as a binding material.

The content of the SBR or its modified material and the content of the CMC or its salt with respect to the mass of the negative electrode active material layer 21 are each preferably 0.1 to 5 percent by mass and more preferably 0.5 to 3 percent by mass. The content of the SBR or its modified material and the content of the CMC or its salt are each preferably 0.1 percent by mass or more in view of the adhesion strength to the negative electrode core 20, and the content thereof is preferably 5 percent by mass or less in view of the low temperature regeneration characteristics.

The rate of the average primary particle diameter of the rubber-based binding material to the pore capacity of the negative electrode active material (that is, the particle diameter of the rubber-based binding material/the pore capacity of the negative electrode active material) is 1.15 to 1.70 g/m$^2$ Since the pore diameter of the negative electrode active material 22 is decreased by pressure application thereto, or while the carbonaceous material is filled in the pores of the negative electrode active material 22, since the particle diameter of the rubber-based binding material, such as the SBR or its modified material, is set to be a predetermined value or more, the rubber-based binding material is suppressed from intruding into the pores of the negative electrode active material 22, and hence, a secondary battery excellent in low temperature regeneration characteristics and high temperature durability can be provided. After the pressure is applied to the negative electrode active material 22, a carbonaceous material containing amorphous carbon as a primary component may be filled in the pores of the negative electrode active material 22.

The negative electrode 5 may be manufactured in such a way that after a negative electrode active material slurry containing the negative electrode active material 22 and the rubber-based binding material 23 is applied on two surfaces of the negative electrode core 20, followed by drying to remove a dispersion medium, coating films thus obtained are compressed so as to form the negative electrode active material layers 21 on the two surfaces of the negative electrode core 20.

[Separator]

For the separator, a porous sheet having an ion permeability and an insulating property is used. The separator (porous sheet) includes a porous base material which contains as a primary component, at least one selected from a polyolefin, a poly(vinylidene fluoride), a polytetrafluoroethylene, a polyimide, a polyamide, a poly(amide imide), a poly(ether sulfone), a poly(ether imide), an aramid, and the like. Among those resins mentioned above, a polyolefin is preferable, and in particular, a polyethylene or a polypropylene is preferable.

The separator may be formed only from a resin-made porous base material or may have a multilayer structure in which a heat resistant layer containing inorganic particles or the like is formed on at least one surface of a porous base material. In addition, the resin-made porous base material may have a multilayer structure, such as a polypropylene/polyethylene/polypropylene structure. The thickness of the separator is, for example, 10 to 30 μm. The separator has, for example, an average pore diameter of 0.02 to 5 μm and a void rate of 30% to 70%. In general, the winding type electrode body 3 includes two separators, and the two separators may be the same.

EXAMPLES

Hereinafter, although the present disclosure will be described with reference to Examples, the present disclosure is not limited to the following Examples.

Example 1

[Formation of Positive Electrode]

As a positive electrode active material, a lithium transition metal composite oxide represented by $LiNi_{0.35}Co_{0.35}Mn_{0.30}O_2$ was used. The positive electrode active material, acetylene black, and a poly(vinylidene fluoride) (PVdF) were mixed together at a solid component mass ratio of 97:2:1, so that a positive electrode active material slurry using N-methyl-2-pyrrolidone (NMP) as a dispersion medium was prepared. Next, after this positive electrode active material slurry was applied on two surfaces of a positive electrode core formed from belt-shaped aluminum foil, followed by drying, coating films thus formed were compressed, so that positive electrode active material layers were formed on the two surfaces of the core. The core described above was cut into a predetermined electrode size, so that a positive electrode was formed.

[Formation of Negative Electrode Active Material]

Flake natural graphite having a crystalline size (Lc(002)) of 15 nm and an interlayer distance ($d_{002}$) of the (002) plane of 0.3356 nm measured by a wide angle X-ray diffractometry was used as a raw material. The natural graphite described above was ground to form approximately spherical particles in appearance. By pressure application using a press machine, a negative electrode active material, the pore diameter of which was decreased, was obtained. The central particle diameter (D50) of this negative electrode active material was 10 μm. The negative electrode active material was a material formed by granulating the flake graphite. In more particular, the negative electrode active material described above contained a plurality of bent flake graphite particles. The bent flake graphite particles were overlapped with each other to form particles of the negative electrode active material.

[Formation of Negative Electrode]

The negative electrode active material described above, a sodium salt of a carboxymethyl cellulose (CMC) as a thickening material, and a dispersion of a styrene butadiene rubber (SBR) as a rubber-based binding material were mixed together at a solid component mass ratio of 98.9:0.7:0.4, so that a negative electrode active material slurry using water as a dispersion medium was prepared. Subsequently, after the negative electrode active material slurry was applied (coating amount: 70 mg/10 cm$^2$) on two surfaces of a negative electrode core formed from belt-shaped copper foil having a thickness of 8 μm, followed by drying, coating films thus formed were compressed using a rolling roller machine, so that negative electrode active material layers having a filling density of 1.1 g/ml were formed on the two surfaces of the core. The core thus obtained was cut into a predetermined electrode size, so that a negative electrode was formed.

The filling density of the negative electrode active material layer was calculated as described below.

(1) A test piece having an area of 10 cm$^2$ is obtained from the negative electrode by cutting, and a mass A (g) and a thickness C (cm) of this test piece are measured.

(2) The active material layers are removed from the negative electrode by a chemical or a physical treatment, and a mass B (g) and a thickness D (cm) of the negative electrode core are measured.

(3) The filling density is calculated from the following formula.

$$\text{Filling density (g/ml)} = (A-B)/[(C-D) \times 10 \text{ cm}^2]$$

[Formation of Electrode Body]

After the positive electrode and the negative electrode described above were wound with belt-shaped separators having a width of 120 mm interposed therebetween, a wound body thus obtained was formed into a flat shape by pressing in a radius direction, so that a winding type electrode body was formed. The wound body was formed by winding a composite including the separator/the positive electrode/the separator/the negative electrode in this order around a cylindrical winding core (the two separators were the same). In addition, the positive electrode and the negative electrode were wound so that core exposing portions thereof were located on the opposite sides in the axial direction of the wound body. Pressing conditions of the wound body were set so that the pressing temperature, the pressing pressure, and the pressing time were 75° C., 100 kN, and 30 minutes, respectively.

[Preparation of Electrolyte Liquid]

To a mixed solvent which was prepared by mixing ethylene carbonate (EC), ethyl methyl carbonate (EMC), and diethyl carbonate (DEC) at a volume ratio of 3:3:4 (25° C., one atmospheric pressure), $LiPF_6$ was added to have a concentration of 1 mol/l, and furthermore, vinylene carbonate was added to have a concentration of 0.3 percent by mass, so that an electrolyte liquid was prepared.

[Formation of Secondary Battery]

By the use of the electrode body, the electrolyte liquid, and a square battery case, a secondary battery (square battery) was formed. A positive electrode terminal was fitted to a sealing plate forming the battery case, and a positive electrode collector was also connected to the positive electrode terminal. In addition, a negative electrode terminal was fitted to the sealing plate, and a negative electrode collector was also connected to the negative electrode terminal. Subsequently, the positive electrode collector and the negative electrode collector were welded to the core exposing portion of the positive electrode and the core exposing portion of the negative electrode, respectively. After the electrode body integrated with the sealing plate was disposed in an insulating sheet formed to have a box shape and was then received in a bottom-closed exterior package can (lateral direction length: 148.0 mm (inside dimension: 146.8 mm), thickness: 17.5 mm (inside dimension: 16.5 mm), and height: 65.0 mm (inside dimension: 64.0 mm)) which formed the battery case, an opening portion of the exterior package can was sealed by the sealing plate. After 65 g of the electrolyte liquid was charged through an electrolyte liquid charge port of the sealing plate, and the electrode body was then sufficiently immersed in the electrolyte liquid, preliminary charge was performed, and a sealing plug was fitted to the liquid charge port, so that a secondary battery (battery capacity: 8 Ah) was obtained.

[Pore Capacity and Average Pore Diameter of Negative Electrode Active Material]

The pore capacity and the average pore diameter of the negative electrode active material were measured using a mercury porosimeter (Autopore IV9510, manufactured by Micromeritics Instrument Corp.). Calculation was performed from a mercury intrusion amount when the pressure was increased from 4 kPa to 400 mPa.

[Average Primary Particle Diameter of Rubber-Based Binding Material]

The average primary particle diameter of the rubber-based binding material was measured using a laser diffraction scattering type particle size distribution measurement device (FPAR-1000, manufactured by Otsuka Electronics Co., Ltd.), and a particle diameter at a cumulative distribution value of 50% was regarded as the average primary particle diameter of the SBR.

Examples 2 to 3 and Comparative Examples 1 to 8

Except for that the pore capacity and the average pore diameter of the negative electrode active material and the average primary particle diameter of the rubber-based binding material were changed as shown in Table 1, by a method similar to that of Example 1, a secondary battery was formed.

TABLE 1

| | PORE CAPACITY OF NEGATIVE ELECTRODE ACTIVE MATERIAL AT PORE DIAMETER OF 0.2 TO 1 μm [ml/g] | AVERAGE PORE DIAMETER OF NEGATIVE ELECTRODE ACTIVE MATERIAL [μm] | AVERAGE PRIMARY PARTICLE DIAMETER OF RUBBER-BASED BINDING MATERIAL [nm] | R/V [g/m$^2$] |
|---|---|---|---|---|
| EXAMPLE 1 | 0.1 | 0.1 | 170 | 1.70 |
| EXAMPLE 2 | 0.1 | 0.1 | 150 | 1.50 |
| EXAMPLE 3 | 0.2 | 0.2 | 230 | 1.15 |
| COMPARATIVE EXAMPLE 1 | 0.8 | 0.5 | 230 | 0.29 |
| COMPARATIVE EXAMPLE 2 | 0.8 | 0.5 | 170 | 0.21 |
| COMPARATIVE EXAMPLE 3 | 0.8 | 0.5 | 150 | 0.19 |
| COMPARATIVE EXAMPLE 4 | 0.2 | 0.2 | 200 | 1.00 |
| COMPARATIVE EXAMPLE 5 | 0.2 | 0.2 | 170 | 0.85 |
| COMPARATIVE EXAMPLE 6 | 0.2 | 0.2 | 150 | 0.75 |
| COMPARATIVE EXAMPLE 7 | 0.1 | 0.1 | 200 | 2.00 |
| COMPARATIVE EXAMPLE 8 | 0.1 | 0.1 | 230 | 2.30 |

[Evaluation of High Temperature Storage Characteristics]

From the battery, the initial discharge capacity of which was measured, a capacity retention rate after high temperature storage was obtained by the following method.
(1) A constant current charge is performed at 5A until the battery voltage reaches 4.1V, and subsequently, a charge is performed at a constant voltage of 4.1 V for 1.5 hours.
(2) Storage is performed at 70° C. and an SOC of 80% for 56 days.
(3) A constant current discharge is performed at 5A until the battery voltage reaches 2.5V.
(4) A constant current charge is performed at 5A until the battery voltage reaches 4.1V, and subsequently, a charge is performed at a constant voltage of 4.1 V for 1.5 hours.
(5) A constant current discharge is performed at 5A until the battery voltage reaches 2.5V. The discharge capacity at this stage was regarded as the discharge capacity after the storage and was divided by the initial discharge capacity, so that a capacity retention rate after the high temperature storage was calculated. In Table 2, as the capacity retention rate after the high temperature storage, a relative value is shown which is obtained when the capacity retention rate after the high temperature storage of Comparative Example 1 is regarded as 100.

[Evaluation Method of High Temperature Cycle Characteristics]

From the battery, the initial discharge capacity of which was measured, a capacity retention rate after high temperature cycles was obtained by the following method.
(1) A charge is performed at a constant current of 2 It (10 A) in an environment at 60° C. until the battery voltage reaches 4.1 V, and a discharge is performed at a constant current of 2 It (10 A) until the battery voltage reaches 3.0 V. This charge/discharge is repeatedly performed 400 cycles.
(2) A discharge is performed at a constant current of 5A until the battery voltage reaches 2.5 V.
(3) A charge is performed at a constant current of 5A until the battery voltage reaches 4.1 V, and subsequently, a charge is performed at a constant voltage of 4.1 V for 1.5 hours.
(4) A discharge is performed at a constant current of 5A until the battery voltage reaches 2.5 V. The discharge capacity at this stage was regarded as a discharge capacity after the cycles and was divided by the initial discharge capacity, so that a capacity retention rate after the high temperature cycles was calculated. In Table 2, as the capacity retention rate after the high temperature cycles, a relative value is shown which is obtained when the capacity retention rate after the high temperature cycles of the battery of Comparative Example 1 is regarded as 100.

[Evaluation of Low Temperature Regeneration Characteristics]

The battery was charged under the following conditions, and a low temperature regeneration value was obtained.
(1) A charge is performed in an environment at 25° C. until SOC reaches 50%.
(2) A battery at an SOC of 50% is charged for 10 seconds in an environment at −30° C. at each of currents of 1.6C, 3.2C, 4.8C, 6.4C, 8.0C, and 9.6C.
(3) A battery voltage immediately after a charge for 10 seconds is measured, and the battery voltage is plotted with the corresponding current value, so that a current value IP (A) at a battery voltage (V) corresponding to an SOC of 100% is obtained. The current value IP was multiplied by the battery voltage (V) corresponding to an SOC of 100%, so that a regeneration value (W) was calculated. In Table 2, as the low temperature regeneration value, a relative value is shown which is obtained when the low temperature regeneration value of the battery of Comparative Example 1 is regarded as 100.

[Evaluation of Adhesion Strength between Negative Electrode Core and Negative Electrode Active Material Layer]

After the negative electrode active material layer was adhered to a double-sided adhesive tape adhered to a resin plate, the negative electrode was pulled up at a predetermined rate, and a load at which the active material layer was peeled away from the core was measured using a load cell. This measured value was regarded as the adhesion strength. In Table 2, as the adhesion strength, a relative value is shown which is obtained when the adhesion strength of the battery of Comparative Example 1 is regarded as 100.

TABLE 2

| | CAPACITY RETENTION RATE AFTER HIGH TEMPERATURE STORAGE [%] | CAPACITY RETENTION RATE AFTER HIGH TEMPERATURE CYCLES [%] | LOW TEMPERATURE REGENERATION VALUE [%] | ADHESION STRENGTH [%] |
|---|---|---|---|---|
| EXAMPLE 1 | 129 | 125 | 96 | 108 |
| EXAMPLE 2 | 131 | 120 | 99 | 105 |
| EXAMPLE 3 | 110 | 121 | 94 | 110 |
| COMPARATIVE EXAMPLE 1 | 100 | 100 | 100 | 100 |
| COMPARATIVE EXAMPLE 2 | 101 | 90 | 98 | 80 |
| COMPARATIVE EXAMPLE 3 | 103 | 86 | 95 | 73 |
| COMPARATIVE EXAMPLE 4 | 112 | 111 | 92 | 107 |
| COMPARATIVE EXAMPLE 5 | 115 | 105 | 83 | 102 |
| COMPARATIVE EXAMPLE 6 | 117 | 100 | 82 | 99 |
| COMPARATIVE EXAMPLE 7 | 116 | 120 | 86 | 110 |
| COMPARATIVE EXAMPLE 8 | 120 | 125 | 87 | 113 |

As apparent from Table 2, compared to Comparative Examples 1 to 8, in each of Examples 1 to 3, while the decrease in low temperature regeneration characteristics was suppressed, the high temperature characteristics were improved. Hence, by a negative electrode active material layer which includes a negative electrode active material containing graphite having a crystalline size of 10 nm or more and an interlayer distance $d_{002}$ of 0.3356 to 0.3360 nm and a rubber-based binding material having an average primary particle diameter of 120 to 250 nm and in which the pore capacity of the negative electrode active material at a pore diameter of 0.2 to 1 μm measured by a mercury porosimeter is 0.5 ml/g or less, and the rate of the average primary particle diameter of the rubber-based binding material to the pore capacity of the negative electrode active material (that is, the particle diameter of the rubber-based binding material/the pore capacity of the negative electrode active material) is 1.15 to 1.70 g/m², while the decrease in low temperature regeneration characteristics is suppressed, the high temperature characteristics can be improved.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
    a negative electrode including a negative electrode core and a negative electrode active material layer provided on at least one surface of the negative electrode core,
    wherein the negative electrode active material layer includes a negative electrode active material which contains graphite having a crystalline size of 10 nm or more and an interlayer distance $d_{002}$ of 0.3356 to 0.3360 nm and a rubber-based binding material having an average primary particle diameter of 120 to 250 nm,
    the negative electrode active material has a pore capacity of 0.1 to 0.2 ml/g at a pore diameter of 0.2 to 1 μm which is measured by a mercury porosimeter, and
    a ratio calculated by dividing the average primary particle diameter of the rubber-based binding material by the pore capacity of the negative electrode active material, is 1.15 to 1.70 g/m²,
    wherein the graphite includes flake graphite particles.

2. The secondary battery according to claim 1,
    wherein
    the negative electrode active material contains bent flake graphite particles.

3. The secondary battery according to claim 1,
    wherein the negative electrode active material contains a carbonaceous material filled in pores of the negative electrode active material.

4. The secondary battery according to claim 3,
    wherein the carbonaceous material contains amorphous carbon as a primary component.

5. The secondary battery according to claim 1,
    wherein the negative electrode active material has an average pore diameter of 0.1 to 0.2 which is measured by mercury porosimeter.

6. The secondary battery according to claim 1,
    wherein the rubber-based binding material has an average primary particle diameter of 150 to 230 nm.

7. A method for manufacturing a secondary battery, the method comprising:
    a step of performing at least one of pressure application to a negative electrode active material containing graphite which has a crystalline size of 10 nm or more and an interlayer distance $d_{002}$ of 0.3356 to 0.3360 nm and filling of a carbonaceous material into pores of the negative electrode active material so that the negative electrode active material has a pore capacity of 0.1 to 0.2 ml/g at a pore diameter of 0.2 to 1 μm which is measured by a mercury porosimeter;
    a step of kneading the negative electrode active material and a rubber-based binding material having an average primary particle diameter of 120 to 250 nm to prepare a negative electrode active material slurry; and
    a step of applying the negative electrode active material slurry to a negative electrode core to form a negative electrode active material layer, wherein a ratio calculated by dividing the average primary particle diameter of the rubber-based binding material by the pore capacity of the negative electrode active material, is 1.15 to 1.70 g/m$^2$ wherein the graphite includes flake graphite particles.

8. The method for manufacturing a secondary battery according to claim 7, wherein the negative electrode active material contains bent flake graphite particles.

* * * * *